United States Patent [19]
Charton

[11] Patent Number: 5,357,762
[45] Date of Patent: Oct. 25, 1994

[54] METHOD FOR FIXING PIECES BY FREEZING, AND DEVICE FOR IMPLEMENTING THE METHOD

[75] Inventor: Henri Charton, Le Brassus, Switzerland

[73] Assignee: Societe Anonyme De La Manufacture D'Horlogerie Audemars, Piquet & Cie, Le Brassus, Switzerland

[21] Appl. No.: 83,450

[22] Filed: Jun. 28, 1993

[30] Foreign Application Priority Data

Jul. 2, 1992 [CH] Switzerland .................. 2093/92

[51] Int. Cl.$^5$ .................. B23Q 3/08; F25D 19/00
[52] U.S. Cl. .................. 62/64; 62/374; 269/7
[58] Field of Search .................. 62/62, 64, 373, 374, 62/DIG. 10; 269/7

[56] References Cited

U.S. PATENT DOCUMENTS

| | | | |
|---|---|---|---|
| 2,606,482 | 8/1952 | Sorensen et al. | 269/7 |
| 2,641,879 | 6/1953 | Dalrymple . | |
| 2,937,437 | 5/1960 | Cole et al. | 29/424 |
| 3,083,002 | 3/1963 | Lacey | 269/7 |
| 3,574,257 | 4/1971 | DuBois | 29/424 |
| 3,807,188 | 4/1974 | Lagodmos . | |
| 3,834,687 | 9/1974 | Martin . | |
| 4,068,412 | 1/1978 | Camp et al. . | |
| 4,091,580 | 5/1978 | Oates . | |

FOREIGN PATENT DOCUMENTS

| | | | |
|---|---|---|---|
| 100648 | 2/1984 | European Pat. Off. | 269/7 |
| 288837 | 7/1978 | Fed. Rep. of Germany . | |
| 162437 | 7/1987 | Japan | 269/7 |
| 654386 | 3/1979 | U.S.S.R. | 269/7 |

*Primary Examiner*—Henry A. Bennet
*Assistant Examiner*—William C. Doerrler
*Attorney, Agent, or Firm*—Darby & Darby

[57] ABSTRACT

A method for fixing pieces by freezing which consists in fixing the pieces to be machined on an auxiliary support having good thermal conductivity, for example made of aluminium, by freezing onto an freeze vice on the copper plate of which there has previously been deposited a film of antifreeze liquid. The auxiliary support is fixed to the freeze vice by vacuum, by magnetism, or by any mechanical clamping. This method makes it possible to eliminate the operation and the time for thawing which, up until now, was required for removing the pieces to be machined from the freeze vice. The auxiliary support may be used as a transfer pallet on which the pieces are held by freezing.

8 Claims, 1 Drawing Sheet

METHOD FOR FIXING PIECES BY FREEZING, AND DEVICE FOR IMPLEMENTING THE METHOD

FIELD OF THE INVENTION

The subject of the present invention is a method for fixing pieces onto a support by freezing for the purpose of machining them, according to which method the support is cooled to below the freezing temperature of a liquid, the support or the pieces to be fixed having previously been wetted with this liquid, so that the pieces adhere to the support by freezing of the liquid.

PRIOR ART

Such a method is described, for example, in U.S. Pat. Nos. 2,937,437, DE 23,63,882, DD 49,755 and CH 671,540. The fixing liquid is generally water, preferably distilled water. The cooling of the support takes place either by circulating a cooling liquid, or electrically by means of Peltier elements. Document U.S. Pat. No. 4,091,580 also discloses a method for cutting sheets of glass, according to which the sheet of glass is fixed by freezing onto a support placed on crushed ice.

This method makes it possible to fix the pieces to be machined without the constraint of mechanical clamping means. For outlining pieces of very varied shapes, made in small runs and having to be cut out by milling, as encountered in aeronautical and space construction, fixing by freezing proves to be the only solution allowing several pieces to be cut from the same sheet of light metal, the problem being to hold the base sheet metal and to immobilise the pieces even after they have been detached over their whole periphery.

However, the method of fixing by freezing, in its current implementation, exhibits a major drawback. The metal sheets to be cut, due to the relatively large dimensions, have a significant thermal inertia, so that the time necessary for releasing the metal sheets and the cut-out pieces, that is to say the thawing time, is significant and considerably retards the manufacturing process. The same problem exists, to a lesser extent, for pieces of small dimensions.

SUMMARY OF THE INVENTION

The object of the invention is to overcome this drawback of the method of fixing by freezing.

The method according to the invention is characterised in that a thermally conducting auxiliary support is firstly fixed to the main support, by having previously laid down a film of antifreeze liquid on the main support or on one face of the auxiliary support in contact with the main support, and in that the piece or pieces to be machined is or are fixed by freezing onto the auxiliary support by cooling the main support.

The fixing of the auxiliary support to the main support is provided by vacuum, magnetism, or any mechanical clamping.

The main support is, of course, cooled to a temperature above the freezing temperature of the antifreeze, so that the auxiliary support is held on the main support exclusively by vacuum, magnetism or mechanical clamping.

Contrary to what might be expected, the film of antifreeze does not have a thermally insulating effect, but on the contrary improves the thermal conduction by creating a thermal bridge between the main support and the auxiliary support. This may be explained by the fact that two plane metal surfaces only truly touch at three points and that the film of antifreeze has better thermal conduction than air. Grooves are preferably provided in the surface of the main support so that the antifreeze liquid subjected to the pressure of the auxiliary support on the main support may be partially removed into these grooves, so that the film remaining is very thin, but sufficient to be sure of preventing the auxiliary support being fastened to the main support by freezing of the water vapour, especially when the vacuum is eliminated.

The elimination of the vacuum, of the magnetic fixing, or the like instantaneously releases the auxiliary support without it being necessary to reheat the main support. Thus the .thaw time has been eliminated, which time would normally be added to the machining cycle time on the machine tool.

The cooling time, that is to say the freezing time, is also eliminated as far as the duration of the machining process is concerned, whether this takes place on a single machine or on several machines in succession, because the pieces to be machined may be fixed by freezing onto the auxiliary support using the "hidden" time of the process, that is to say by fixing these pieces by freezing onto an auxiliary support placed on an external plate, by the method according to the invention.

The auxiliary support, produced in the form of a pallet, may be used as a support for transferring from one machining station to another machining station or to an unloading station. To this end, it is sufficient for the thermal inertia, that is to say the specific heat of the auxiliary support, to be sufficient to maintain the temperature of the pallet at a temperature below or equal to the freezing temperature (in principle 0° C.).

The subject of the invention is also a device for implementing the method according to the invention, comprising a plane support made from a thermally conducting material provided with cooling means, characterised by the fact that the auxiliary support consists of a pallet and that the plane surface of the main support has a groove in which there is housed a gasket delimiting a zone to be evacuated, a duct opening out into this zone and intended to be connected to a vacuum source.

BRIEF DESCRIPTION OF THE DRAWINGS

The appended drawing represents, by way of example, two embodiments of devices for implementing the method according to the invention.

DESCRIPTION OF THE PREFERRED EMBODIMENT

Figure 1:
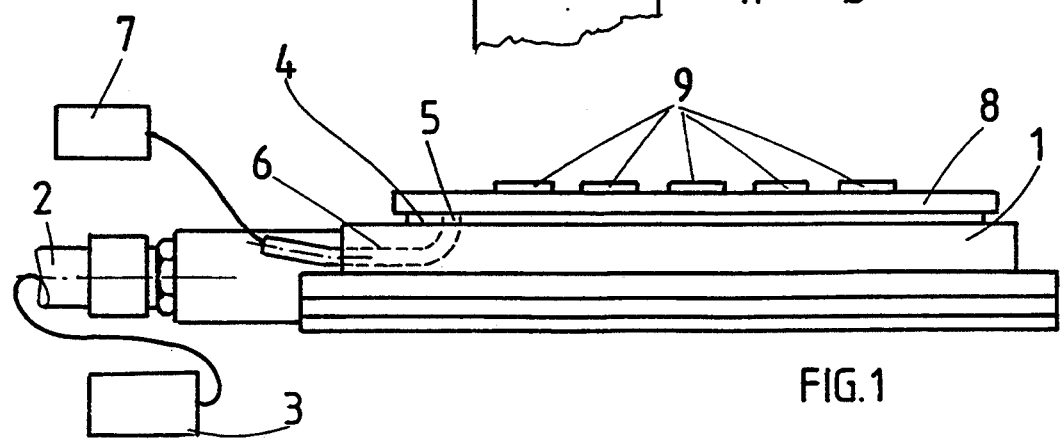
FIG. 1 is a elevation of a fixed freeze vice.

The freeze vice represented in FIG. 1 is of known design so far as its cooling means are concerned. It comprises a body 1 equipped with channels connected to a double duct 2 connected to a cooling installation 3. In this double duct 2 there flows, in a known way, a cooling liquid for cooling the body 1. On the body 1 there is fixed a copper plate 4 in close thermal contact with the body 1. This copper plate 4 is pierced with a hole 5 connected to a duct 6 itself connected to a pump 7. A film of antifreeze such as ANTIFROGEN (registered trade mark) is deposited onto the copper plate 4. A metal plate or pallet 8, preferably made from aluminium due to its good thermal conductivity, is placed on the plate 4. The pallet 8 is then fixed onto the plate 4 by evacuating the air between its two pieces by means of the pump 7. The pieces to be machined 9 are then placed on the pallet 8. If the body 1 has not already been cooled, the latter is cooled so as to fix the pieces 9 onto the pallet 8 by freezing. The release of the pallet 8 takes place simply by eliminating the vacuum between this part and the copper plate 4.

The freeze vice represented in FIG. 1 may be used, either as a machining support on a machine tool, or as a device for fixing pieces 9 onto the pallet 8, this pallet then being transferred to an analogous freeze vice mounted at a machining station.

Figure 2:
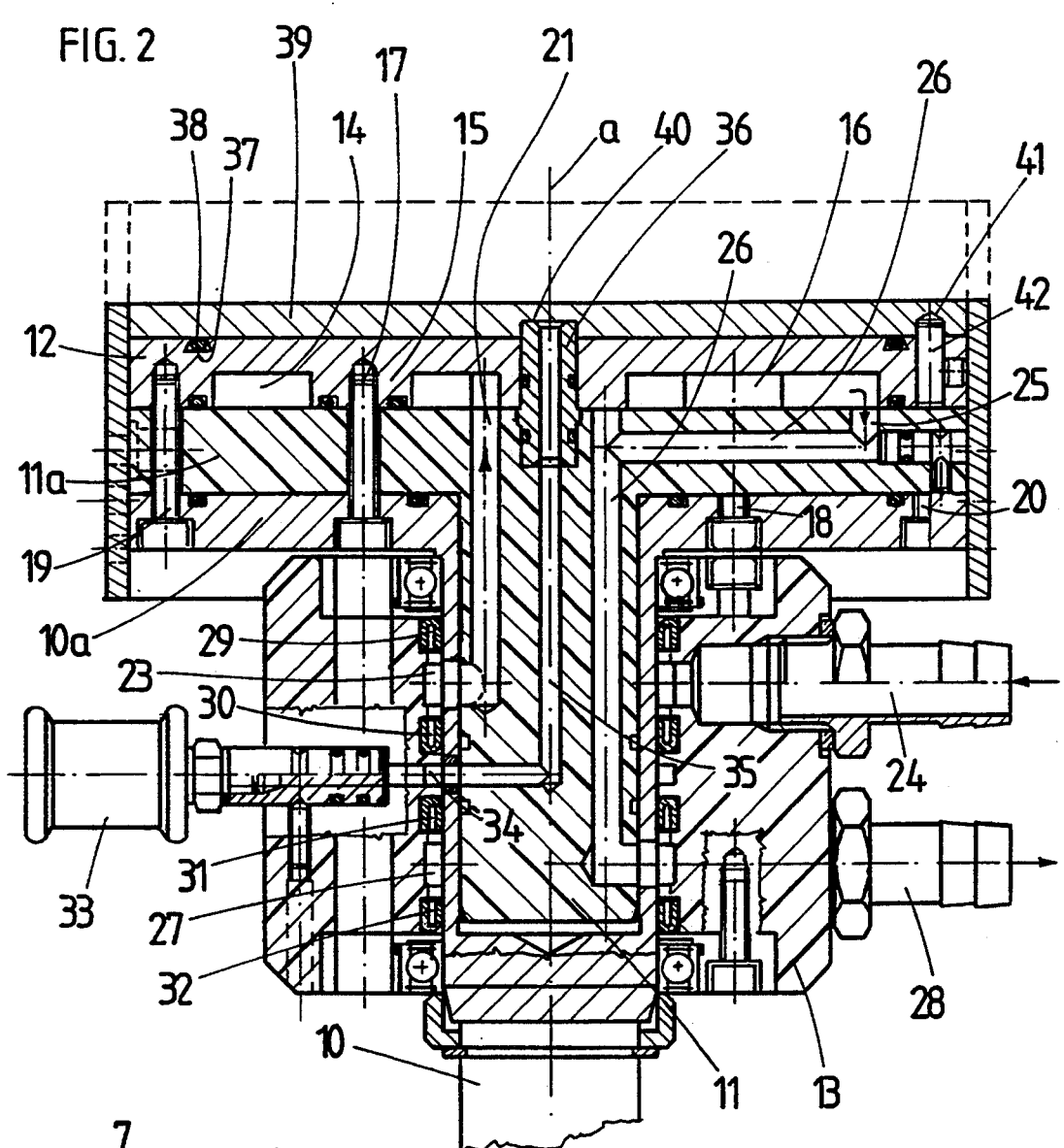
FIG. 2 is an axial section of a rotary freeze vice.

FIG. 2 represents a rotary freeze vice of overall circular shape intended to support pieces to be machined on a lathe or on a turntable.

This freeze vice comprises a stainless steel shaft 10, which is hollow over the greater part of its length and equipped with a cheek 10a. In this shaft 10 there is fixed a body made of synthetic material 11 also having a cheek 11a pressing on the cheek 10a. On the cheek 11a there is mounted a copper disc 12. The shaft 10 is mounted rotationally in a fixed sleeve 13 made from synthetic material.

The disc 12 has, on its lower face, a hollow 14 containing a certain number of islands, such as 15 and 16, for fixing the disc by means of screws such as 17 and 18, the disc 12 further being fixed, at its periphery, by a certain number of screws such as 19 and 20. The hollow 14 is closed by the cheek 11a and constitutes a chamber for cooling the disc 12. The chamber 14 communicates with five channels such as 21, parallel to the axis a, the channels being made in the body 11. These five channels communicate, through the wall of the hollow shaft 10, with an annular chamber 23 of the sleeve 13 into which a tube 24 opens out, which constitutes the inlet for the cooling liquid. The cooling liquid emerges again from the chamber 14 via five holes, such as the hole 25, distributed circularly over the cheek 11a and each communicating with a duct 26, these ducts 26 opening out into an annular chamber 27 of the insulating sleeve 13 communicating with the outlet 28 for the cooling liquid. The sealing of the chambers 23 and 27 is ensured by rotating seals 29, 30, 31, 32.

The sleeve 13 is also provided with an inlet 33 connected to a pump analogous to the pump 7 in FIG. 1. The inlet 33 communicates with an annular chamber 34 made in the inner wall of the sleeve 13, this chamber 34 communicating with an axial duct 35 in the body 11. The duct 35 is extended into a cylindrical piece 36 extending beyond the surface of the copper disc 12 and constituting a centering device. Sealing gaskets are provided wherever necessary.

The upper face of the disc 12 has a circular groove 37 in which there is housed a gasket 38.

The disc 12 is intended to receive an aluminium disc 39 constituting a pallet or a setting for the piece to be machined. This disc 39 has a central circular housing 40 in which is housed the centering device 36 of the freeze vice. In this particular case, the disc 39 further has, close to its edge, a blind hole 41 in which there is inserted an indexing pin 42 intended to fix the angular position of the disc 39.

The freeze vice is used in the same way as the freeze vice of FIG. 1. The disc 12 is coated with a film of antifreeze before installing the disc 39. The disc 39 is fixed by vacuum by the evacuation of air through the centering device 36, the seal 38 providing sealing of the evacuated body.

The surface of the disc 12 preferably further exhibits grooves for evacuating the excess antifreeze when evacuating.

The copper plate 4 of the device according to FIG. 1 also has a groove and a sealing gasket.

Whether the freeze vice is fixed or rotary, cooling is also be obtained by means of Peltier elements.

The auxiliary support could be fixed to the freeze vice by other means, for example by magnetism or by any mechanical clamping.

I claim:

1. A method for fixing at least one piece onto a support by freezing for the purpose of machining said piece, wherein a main support is cooled to below the freezing temperature of a first freezing liquid, wherein a thermally conducting auxiliary support is fixed to the main support, a film of antifreeze liquid having previously been laid down between the main support and a first face of the auxiliary support in contact with the main support, wherein at least a part of a second face of said auxiliary support being in contact with said piece is wetted with said first freezing liquid and wherein said piece is fixed by freezing onto the auxiliary support by cooling the main support by a temperature below the freezing temperature of said first freezing liquid and above the freezing temperature of said antifreeze liquid.

2. The fixing method according to claim 1 for the purpose of successively machining pieces at least one machining station, wherein the pieces to be machined are fixed onto an auxiliary support by means of an auxiliary freeze vice and wherein the cooled auxiliary support carrying the pieces to be machined is transferred onto a freeze vice of the machining station kept cooled continuously and on which the auxiliary support is fixed.

3. The fixing method according to claim 2 applied to the machining of pieces at several machining stations in succession, wherein each machining station comprises a freeze vice kept cool continuously.

4. The fixing method according to claim 1, wherein the auxiliary support is fixed onto the main support by vacuum.

5. A device for implementing the method according to claim 4, comprising a plane support made from thermally conducting material provided with cooling means, wherein the auxiliary support is made of a pallet and wherein the plane surface of the main support has a groove in which there is housed a seal delimiting a zone to be evacuated, a duct opening out into this zone and intended to be connected to a vacuum source.

6. The device according to claim 5, wherein the main support is mounted so as to rotate.

7. The device according to claim 6, wherein the support is fitted with a centering device.

8. The device according to claim 7, wherein the duct for evacuating air passes axially through the centering device.

* * * * *

UNITED STATES PATENT AND TRADEMARK OFFICE
CERTIFICATE OF CORRECTION

PATENT NO. : 5,357,762
DATED : October 25, 1994
INVENTOR(S) : Henri CHARTON

It is certified that error appears in the above-indentified patent and that said Letters Patent is hereby corrected as shown below:

On title page, item [73] Assignee, change "Piquet" to --Piguet--.

Signed and Sealed this

Thirty-first Day of January, 1995

Attest:

BRUCE LEHMAN

Attesting Officer

Commissioner of Patents and Trademarks